United States Patent [19]

Puppin

[11] Patent Number: 5,332,204
[45] Date of Patent: Jul. 26, 1994

[54] HOLLOW GASKET WELDER

[75] Inventor: Giuseppi Puppin, Bayport, Minn.

[73] Assignee: Andersen Corporation, Bayport, Minn.

[21] Appl. No.: 161,171

[22] Filed: Dec. 1, 1993

Related U.S. Application Data

[63] Continuation of Ser. No. 917,787, Jul. 20, 1992, abandoned, which is a continuation of Ser. No. 865,642, Apr. 9, 1992, abandoned, which is a continuation of Ser. No. 336,077, Apr. 11, 1989, abandoned.

[51] Int. Cl.$^5$ ............................................. B25B 11/00
[52] U.S. Cl. ...................................... 269/21; 269/287; 269/900; 29/281.1
[58] Field of Search ............. 269/21, 287, 288, 289 R, 269/289.2, 900; 29/281.1, 235, 281.5, DIG. 13

[56] References Cited

U.S. PATENT DOCUMENTS

| | | | |
|---|---|---|---|
| 4,582,305 | 4/1986 | Brothers | 269/21 |
| 4,778,326 | 10/1988 | Althouse et al. | 269/21 |
| 4,803,944 | 2/1989 | Roberson | 269/21 |
| 4,816,015 | 3/1989 | Holder et al. | 269/21 |
| 4,833,051 | 5/1989 | Imamura | 269/21 |

OTHER PUBLICATIONS

Schuster Brochure on four point seal welding, (no date).

Primary Examiner—Bruce M. Kisliuk
Assistant Examiner—Eileen P. Morgan
Attorney, Agent, or Firm—Merchant, Gould, Smith, Edell, Welter & Schmidt

[57] ABSTRACT

The invention is a jig for holding and positioning a flexible hollow article while being connected to another flexible hollow article. The jig includes a platen having a bottom surface and a die having a top surface. When the die and platen are positioned proximate each other, a cavity is formed in the die and platen. The cavity is sized and configured to accept the hollow flexible. One of the platen or die have formed therein a passageway in fluid communication with the cavity, whereby a vacuum may be applied to the outside surface of the article while in the cavity, whereby the shape of the hollow article is maintained.

1 Claim, 3 Drawing Sheets

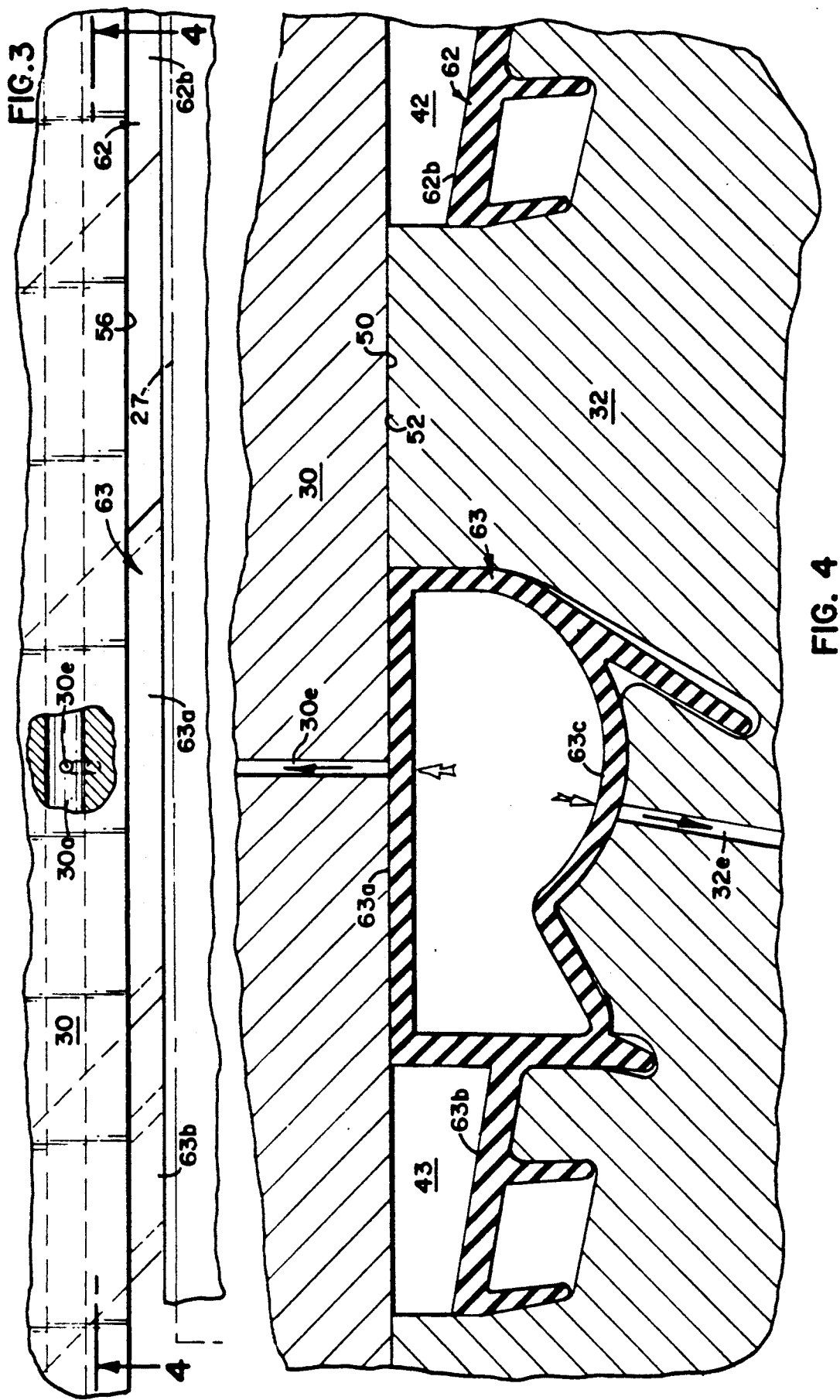

HOLLOW GASKET WELDER

This is a continuation of prior application Ser. No. 07/917,787, filed on Jul. 20, 1992, entitled HOLLOW GASKET WELDER, which was abandoned upon the filing hereof, which is a continuation of Ser. No. 07/865,642, filed on Apr. 9, 1992 now abandoned, which is a continuation of Ser. No. 07/336,077, filed on Apr. 11, 1989 now abandoned.

BACKGROUND OF THE INVENTION

1. Field of the Invention

This invention relates generally to gasket welders and more particularly to a gasket welder wherein a vacuum is applied to the outer surface of the gasket, thereby allowing the gasket to retain its original shape while being welded to another gasket.

2. Description of the Prior Art

In various Industries, there has always been the need to weld two plastic parts together to form a single article of manufacture. When the two thin walled parts to be joined are flexible, there is the problem of maintaining the profile of the parts, especially if they are hollow, while they are being welded.

In the door and window industry, this problem has recently become more acute. With the higher demand for increased performance, it has been necessary to upgrade the quality of weatherstripping available. One type of weatherstripping commonly used for doors and windows is a TPE (thermal plastic elastomer) weatherstrip which has a hollow portion. In addition, a variety of weatherstrip materials are utilized, such as PVC. The hollow portion is advantageous for many purposes, but it does raise the problem of how to effectively join two pieces of weatherstripping having the hollow profile. During the manufacturing process, when the two weatherstrips are joined, quite often the weatherstripping is deformed during the manufacturing operation and a less than perfect joint is formed. This creates a potential for air or water leakage around the improperly formed joint.

Many different welding machines have been used to join such weatherstrips having a hollow, flexible construction. One such machine is the DS four-point seal welding machine ADS-4 by Dieter Schuster GmbH. Such a welding machine is able to weld four corners of a frame at one time, thereby providing for a completed gasket in one operation. However, such a welding machine does not allow for the consistent high quality welding of a gasket having a thin wall, flexible or hollow construction.

The present invention provides for a new jig which may be used with such welding machines to overcome the problems associated with the prior art and provide for a means of maintaining the profile of the weatherstripping material while it is being welded.

SUMMARY OF THE INVENTION

The invention is a jig for holding and positioning flexible hollow articles. The jig includes a platen having a bottom surface and a die having a top surface. When the bottom surface is positioned proximate the top surface, they form a cavity sized and configured to accept a flexible hollow article. Either the platen or die has formed therein a passageway which is in fluid communication with the cavity. The passageway allows for a vacuum to be applied to the outside surface of the article while in the cavity, whereby the shape of the hollow article is maintained.

The invention is also a jig for holding and cooperatively positioning a first flexible hollow article for connecting to a second flexible hollow article. The jig has an upper platen assembly having first and second platens each with a bottom surface and a lower die assembly having first and second die, each having an upper surface. The first and second die each have a cavity formed therein. The cavity of the first die is sized and configured to accept a first flexible hollow article and the cavity of the second die is sized and configured to accept a second flexible hollow article. The top surfaces, when positioned proximate the bottom surfaces, hold the articles in the cavities in position for manipulation and to cooperatively connect the articles to each other. Either the first platen or first die has formed therein a passageway which is in fluid communication with the cavity of the first die, whereby a vacuum may be applied to the outside surface of the articles while in the cavity, whereby the shape of the hollow articles are maintained. The invention may also include a welding machine which incorporates the jig.

Still further, the invention is a method for cooperatively connecting a first flexible hollow article to a second flexible hollow article. The method includes the steps of placing a first flexible hollow article in a jig and also placing a second flexible hollow article in the jig. The jig is then positioned to place the first and second articles in a working position and applying a vacuum, through a passageway in the jig, to the articles to maintain the profiles of the articles while the articles are being cooperatively connected to each other.

BRIEF DESCRIPTION OF THE DRAWINGS

FIG. 3 is a top plan view of a portion of the platen shown in FIG. 1.

FIG. 4 is a cross-sectional view taken generally along the lines 4—4 of FIG. 3;

DETAILED DESCRIPTION OF THE INVENTION

Figure 1:
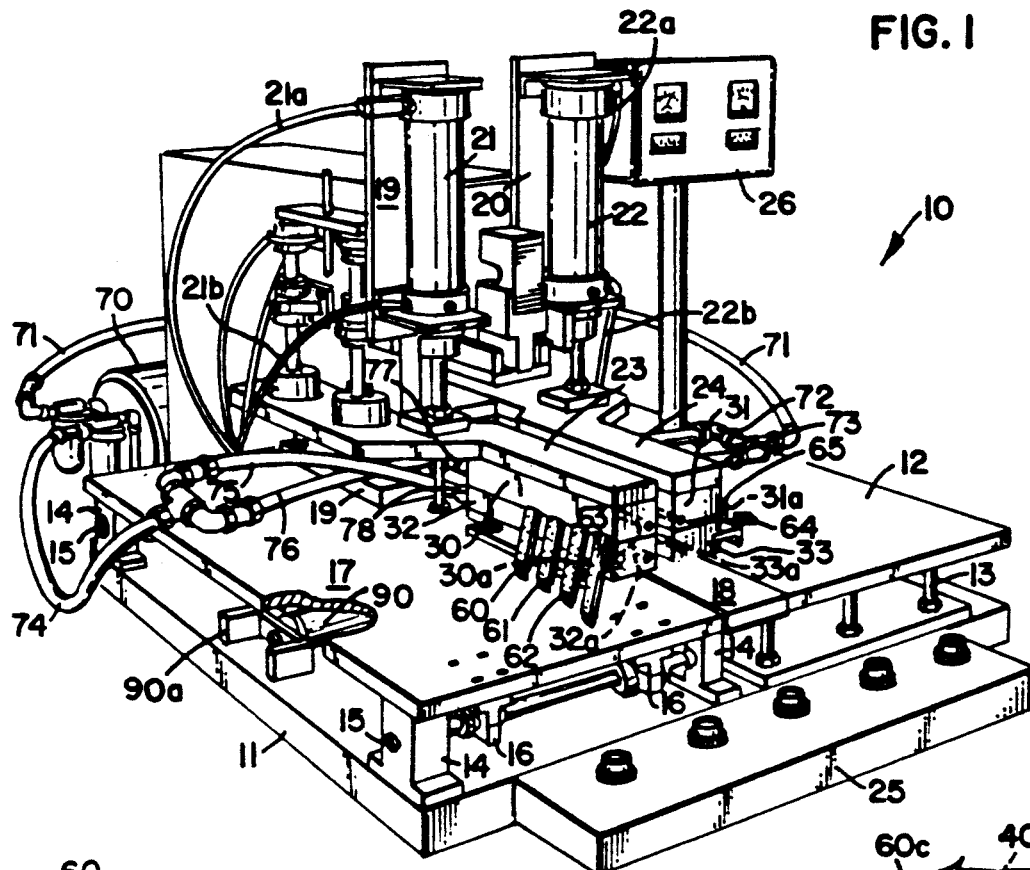
FIG. 1 is a perspective view of a hollow gasket welder embodying the present invention.

Referring to the drawings, wherein like numbers represent like parts throughout the several views, there is generally disclosed at 10 a hollow gasket welder. The gasket welder 10, with the exception of the modified jig assembly and vacuum means, is well known in the art. A brief description of the gasket welder will be given for the purposes of better understanding the present invention. However, it is understood that such gasket welders, with the exception of the modified jig assembly and vacuum means, are well known in the art. As stated in the description of the prior art, the Dieter Schuster GmbH welder is one such example. The welder 10 has a base 11 on which a stationary tabletop 12 is mounted by a plurality of bolts 13 or other suitable means. Support blocks 14 are mounted on the base 11 and rods 15 are cooperatively connected thereto by suitably mounting them in apertures in the mounting block 14. Bearings 16 are mounted on the rods 15 and a moveable tabletop 17 is mounted on the bearings. An air cylinder 90 is mounted in support block 90a. The air cylinder 90 is cooperatively connected by means not shown, but well known in the art, to tabletop 17 so that activation of the air cylinder 90 causes movement of the tabletop 17. A guard plate 18 is mounted to the stationary tabletop 12 and has an opening in which the moveable tabletop 17 is configured to move therein in the direction of the longitudinal axis of air cylinder 90. A first vertical support member assembly 19 is cooperatively connected to the moveable tabletop 17 and a second vertical support member assembly 20 is cooperatively connected to the stationary tabletop 12. A first vertical pneumatic cylinder 21 is cooperatively mounted to the first vertical support member assembly 19 by appropriate means and a second vertical pneumatic cylinder 22 is appropriately mounted to the second vertical support assembly 20 by appropriate means. Pneumatic control lines 21a and 21b are cooperatively connected at one end to the pneumatic cylinder 21 and to a pneumatic source at their other end. Similarly, pneumatic lines 22a and 22b are cooperatively connected to the second pneumatic cylinder 22 at one end and to the pneumatic source at their other end. A first support arm 23 is cooperatively connected to the first pneumatic cylinder 21 and a second support arm 24 is cooperatively connected to the second pneumatic cylinder 22. The movement of the cylinders 15, 21 and 22 are appropriately controlled by a control panel 25 having display gauges 26. As shown diagrammatically in FIGS. 5a through 5e, the welder 10 also has a heating element 27 and a stop element 28. The elements 27 and 28 are hidden from view when viewed in FIG. 1. However, as previously indicated, the welder, as described in the foregoing paragraphs, is well known in the art.

An upper platen assembly 29 includes a first platen 30 and a second platen 31. The platens 30 and 31 are separate and both have rectangular cross sections. The first platen 30 has a bottom surface 50 and the second platen 31 has a bottom surface 51. A lower die assembly includes a first die 32 and a second die 33. The dies 32 and 33 are also rectangular in cross section. The die 32 has a top surface 52 and the second die 33 has a top surface 53. The first platen has an inside surface 56 and the second platen has an inside surface 54. The first die 32 has an inside surface 57 and the second die 33 has an inside surface 55.

Figure 2:
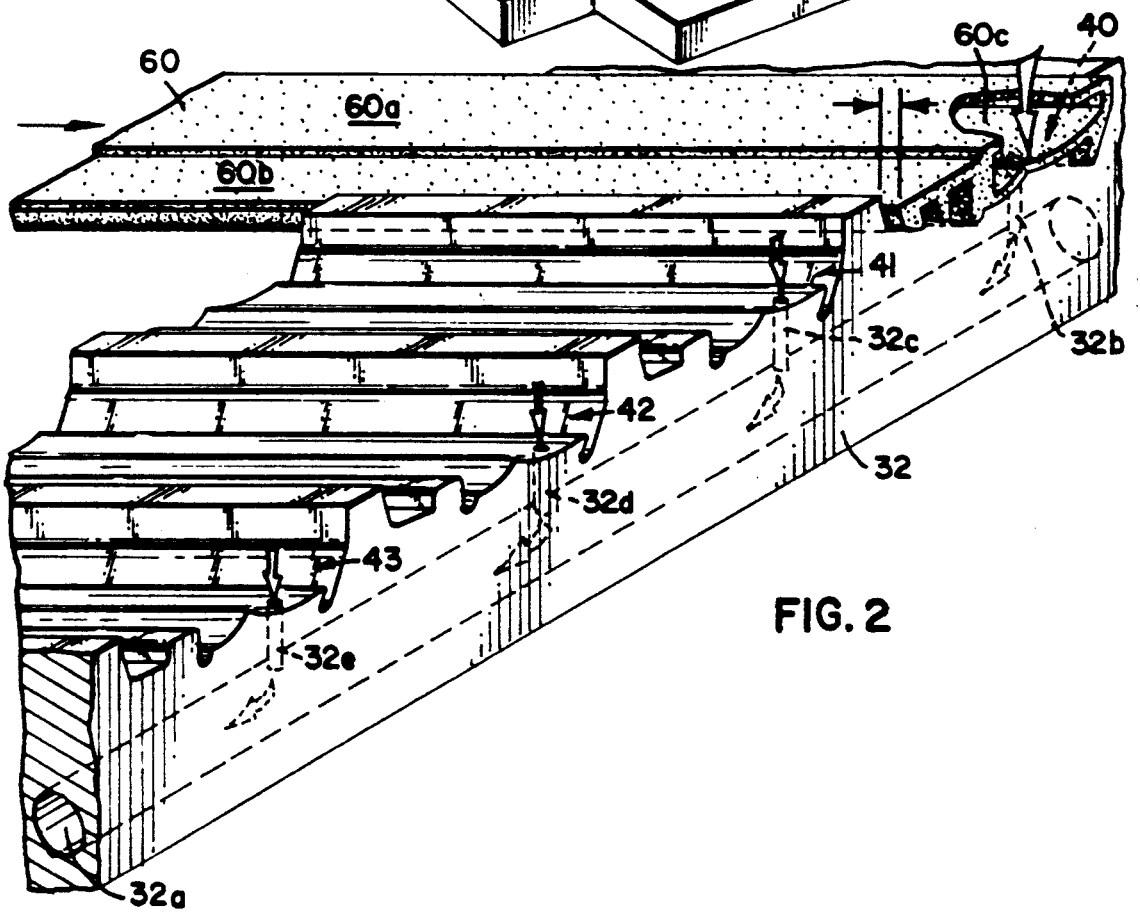
FIG. 2 is an enlarged perspective view as viewed from above of one of the dies utilized in the welder shown in FIG. 1.

As more clearly shown in FIG. 2, a plurality of cavities 40 through 43 are formed in the first die 32. The cavities are at a 45° angle to the longitudinal axis of the die and parallel to the bottom surface of the die 32. Similar cavities are formed in the die 33 and are also at a 45° angle to the longitudinal axis of die 33. Therefore, as will be more fully described hereafter, the cavities, when brought together, will form a 90° angle. The configuration of the cavities 40 through 43 will depend upon the shape of the article to be welded. The cavities are formed to support the outer profile of the article. Articles 60, 61, 62 and 63 all have the configuration as clearly shown in FIGS. 2 and 4. The articles are all similar and accordingly a detailed description of only article 60 will be given. The article 60 has two top planar surfaces 60a and 60b, with the surface 60b being slightly lower than the surface 60a. The top surface 60b forms a portion of the flange section of the article 60 which comprises a solid material. The top surface 60a has a cavity formed underneath it and a lower surface 60c, thereby forming a hollow portion of the article.

The article 60, and the other articles 61 through 63 may of course take on any suitable shape or configuration. However, the article 60, as shown, is that of a weatherstrip used in a door sold by Andersen Corporation, Bayport, Minnesota. Article 60 is referred to in this specification as a hollow article because of the cavity formed between the surfaces 60a and 60c. The welding of such hollow articles gives rise to special problems in the industry. These special problems are caused because of the deflection between the surfaces 60a and 60c during welding. It is understood that when the term hollow article is used, this may also refer to an article which is a solid, but which have outer surfaces which are easily deformed or compressed during the welding operation.

The foregoing description of the upper platen assembly and lower die assembly as presently described is also well known in the art. It is of course understood that the cavities formed in the dies 32 and 33 take the shape of the outer profile of the article to be welded. It is well known in the art to adjust this configuration to match that of the article.

With the foregoing still describing what is well known in the art, it has been found that such a welder does not adequately weld flexible plastic articles to each other. The pressures exerted during welding cause the surface 60a and 60c to deflect, thereby giving an improper weld to the matching article in the second die. To overcome this problem, applicant has developed a means of applying vacuum to the article being welded, thereby maintaining the shape of the article during the welding process. Longitudinal passageways, in the shape of cylindrical bores, are formed in the first and second platens and first and second dies. In the first platen 30, a longitudinal bore 30a is formed; in the second platen 31 a longitudinal bore 31a is formed; in the first die 32 a longitudinal bore 32a is formed; and in the second die 33, a longitudinal bore 33 is formed. The bores extend the entire length of the platens and dies. At the front end of the platens and dies, as can be seen in FIG. 1, a suitable cap or plug is secured into the respective bores so that there will be no air leakage. Alternately, it is understood that the bores could simply not extend outside of the platens and dies so that a cap or plug would not be necessary to maintain the airtight connection. The cap or plug is utilized to stop air leakage and one skilled in the art would know how to construct and utilize the cap or fitting as they are well known in the art. The other end of the bores are cooperatively connected to a vacuum source. A suitable fitting 77 is cooperatively connected to the bore 30a and a fitting 78 is cooperatively connected to the bore 32a. A hose 75 is cooperatively connected to the fitting 78 and a hose 75 is cooperatively connected to the fitting 77. The hoses 75 and 76 are then joined by means of a T which has a connection to a hose 74. The hose 74 is connected at its other end to a vacuum pump 70. Similarly, a hose 72 is cooperatively connected to the vacuum pump 70 by suitable fitting and the hose 71 is cooperatively connected to a T which is split off and is cooperatively connected by suitable fittings to a first hose 72 and a second hose 73. The first hose 72 is cooperatively connected by a suitable fitting to the bore 31a and the second hose 73 is cooperatively connected by a suitable fitting to the bore 33a. The pump may be any suitable vacuum pump such as the pump made by Gast, model 0522/V3/G18DX.

Secondary passageways are formed in the first die 32 such that the bore 32a is in fluid communication with each of the cavities 40 through 43. Secondary passageway 32b fluidly connects the passageway 32a to the cavity 40; passageway 32c fluidly connects the passageway 32a to the cavity 41; secondary passageway 32d fluidly connects passageway 32a to the cavity 32; and, secondary passageway 32e fluidly connects the passageway 32a to the cavity 43. The secondary passageways 32b through 32e are positioned proximate the edges of the cavities next to the sidewall 57. The secondary passageways may simply be formed by drilling a hole from the cavity into the bore 32a. In order to bring the secondary passageways closer to the inner wall 57, the secondary passageways may be placed at an angle so that the connection to passageway 32 is closer to the sidewall 57 than is the connection to the cavities.

Similarly, the passageway 30a in the first platen 30 is fluidly connected to the cavities 40 through 43. As shown in FIGS. 3 and 4, a secondary passageway 30e is fluidly connected between the bore 30a and the cavity 43. Similar secondary passageways are also cooperatively connecting the passageway 30a to the respective cavities 40 through 42.

The second platen 31 and the second die 33 are mirror images of the first platen 30 and the first die 32. Four similar cavities are formed in the second die 33 which are the mirror images of the cavities formed in the first die 32. The cavities in the second die 33 would, the same as the cavities in the first die 33, correspond to the outer profile of the article to be welded. The passageway 31a is placed in fluid communication with the cavities by means of secondary passages, the same as in the first die. Similarly, the bore 32a is placed in fluid communication with the cavities by means of secondary passageways, similar to the first platen 30.

While the cavities have been described as being formed in the dies 32 and 33, it is also understood that a portion of the cavities may be formed in the platens 30 and 31 if desired. In addition, while the jig of the present invention has been described as having a top platen and a bottom die as separate pieces, it is understood that they could be formed as one piece. However, this would not be preferred in that it would be necessary to slide the article to be welded through the hole formed in the jig and it would not be possible to separate the two to have easier insertion of the article.

Figure 5A:
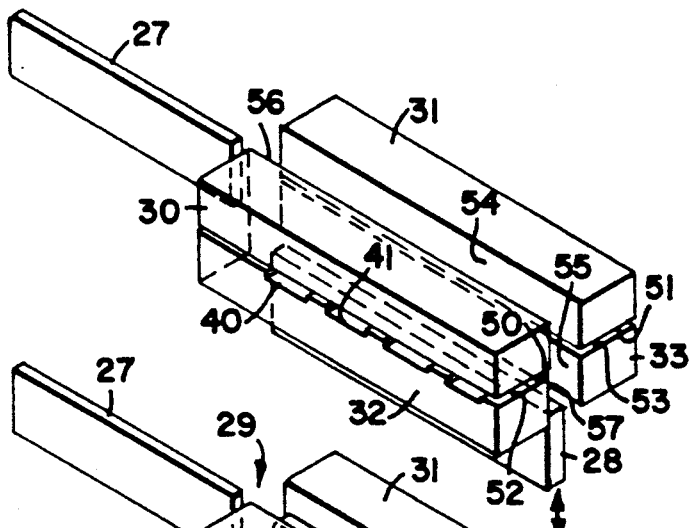
FIGS. 5a through 5e are diagrammatical representations of various steps that are taken throughout the welding process.
Figure 5B:
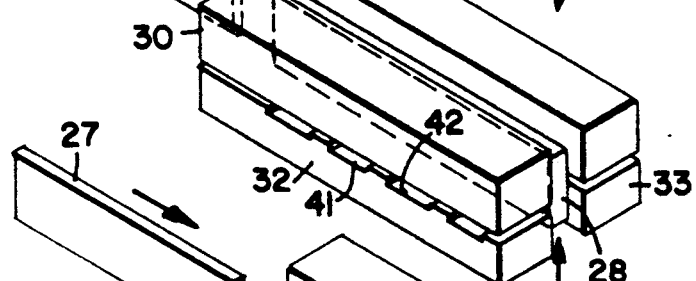
Figure 5C:
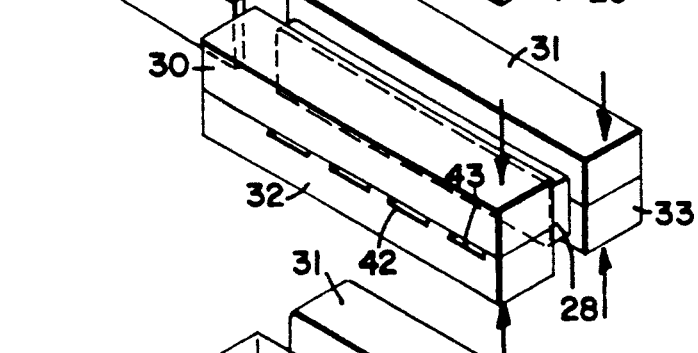

In operation, the platens 30 and 31 are spaced apart from the dies 32 and 33 so that their surfaces are not in contact. The vertical movement of the upper platen assembly 29 is controlled by the activation of the pneumatic cylinders 19 and 22. The position of the platen and dies in this first step is shown in FIG. 5a. Next, as shown in 5b, the stop 28 is raised to its up position. The articles 60 through 63 to be welded are then inserted into the cavities 40 through 43 in die 32 and into the respective cavities of die 33. For clarity's sake, the articles are not shown in FIGS. 5a through 5d. As previously described, the cavities in the second die 33 are also not shown, but are mirror images of the cavities 40 through 43. When the articles are inserted into the cavities, they are inserted until they come up against the stop 28. This is also shown in FIG. 3 how the articles contact the stop 28. During this process, the vacuum pump 70 is on and is drawing a vacuum. However, because the platens are away from the dies, there is an abundance of air which can flow into the secondary passages and accordingly does not affect the insertion of the articles into the cavities. When the articles have been inserted the cavities and against the stop 28, the cylinders 19 and 22 are activated, causing the platens 30 and 31 to go downward such that their top surfaces 50 and 51 contact the bottom surfaces 52 and 53 of the dies 32 and 33. This is shown in FIG. 5c. Now, with the platens against the dies, the vacuum which is being drawn through the passages 30a, 31a, 32a and 33a take effect through the secondary passageways and create a sucking action on the article in their respective cavities. This is shown in FIG. 4 where the vacuum being drawn through secondary passages 30e maintains the profile of the article 63 by sucking on the top surface 63a and the vacuum being pulled through secondary passageway 32e pulls on the bottom portion 63c, thereby maintaining the profile of the article 63.

Figure 5D:
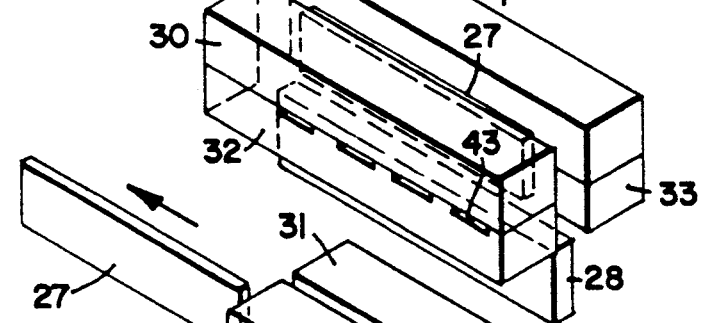

Next, as shown in FIG. 5d, the stop element 28 is lowered and the stop element 28 is lowered and the heating element 27 is moved into position between the platen and dies. The heating element is slightly narrower than the stop element 28. This is shown in FIG. 3 in that the heating element is shown in a dashed line and is spaced apart from the edge of the article 63. The vacuums through the secondary passageways continue to pull on the articles in the cavities, keeping their profile.

Figure 5E:
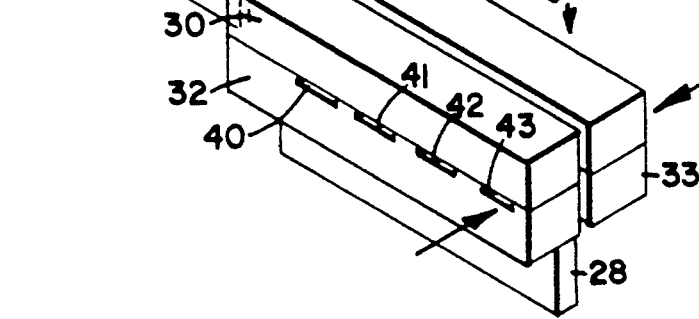

Then, as shown in FIG. 5e, the heating element 27 is removed and the first platen and first die are moved inward toward the second platen and second die by movement of the moveable tabletop 17. This movement is controlled by the movement of the air cylinder of the pneumatic cylinders 90. The articles being held in the cavities 40 through 43 then contact the articles being held in the respective cavities of the second die 33. When they come in contact, they have been sufficiently heated by the element 27 such that they are now welded together to form a single article. The dies 32 and 33 are shown as having four cavities each. It is understood that this could also be used with a single cavity in each die if only two articles were to be welded. However, the use of four cavities in each die is advantageous when creating a gasket for a door or window. By properly placing the four weatherstrips of the door into the dies, a single, unitary rectangular gasket is formed. Other combinations of cavities may also be used. The use of such multiple cavity dies to form a single rectangular gasket is also well known in the art.

Other modifications of the invention will be apparent to those skilled in the art in light of the foregoing description. This description is intended to provide specific examples of individual embodiments which clearly disclose the present invention. Accordingly, the invention is not limited to these embodiments or the use of elements having specific configurations and shapes as present herein. All alternative modifications and variations of the present invention which follow in the spirit and broad scope of the appended claims are included.

I claim:

1. A method of cooperatively connecting a first flexible hollow article to a second flexible hollow article, each of said articles having a profile comprising:
    (a) placing a first flexible hollow article in a jig;
    (b) placing a second flexible hollow article in the jig;
    (c) positioning the jig to place the first and second articles in a working position;
    (d) applying a vacuum to the articles through a passageway in the jig to maintain the profiles of the articles;
    (e) moving the first article to proximate the second article such that their profiles are in alignment; and
    (f) cooperatively connecting the articles to each other for form a single article while the vacuum maintains the profiles of the articles.

* * * * *

UNITED STATES PATENT AND TRADEMARK OFFICE
CERTIFICATE OF CORRECTION

PATENT NO. : 5,332,204
DATED : July 26, 1994
INVENTOR(S) : Giuseppe Puppin

It is certified that error appears in the above-indentified patent and that said Letters Patent is hereby corrected as shown below:

Title page, item [75], Inventor: delete "Giuseppi" and substitute therefor --Giuseppe--

Title page, item [57], Abstract: line 8, insert --article-- after the word "flexible"

Column 3, line 7, insert -- (not shown)-- after the word "opening"

Column 4, line 37, delete "33" and substitute therefore --33a--

Column 4, line 57, insert --connected --after the word "cooperatively"

Column 5, line 66, insert --into-- after the word "inserted"

Column 6, line 13, delete "and the stop element 28 is lowered" after the word "lowered"

Column 6, line 66 (claim 1), delete "for" and substitute therefore --to--

Signed and Sealed this

Ninth Day of May, 1995

Attest:

BRUCE LEHMAN

*Attesting Officer*   *Commissioner of Patents and Trademarks*